(12) United States Patent
Branscomb

(10) Patent No.: US 11,910,185 B1
(45) Date of Patent: *Feb. 20, 2024

(54) SYSTEMS, METHODS AND APPARATUS FOR DATA PRIVACY PROTECTION BASED ON GEOFENCE NETWORKS

(71) Applicant: Bennett Hill Branscomb, Ingleside, TX (US)

(72) Inventor: Bennett Hill Branscomb, Ingleside, TX (US)

( * ) Notice: Subject to any disclaimer, the term of this patent is extended or adjusted under 35 U.S.C. 154(b) by 344 days.

This patent is subject to a terminal disclaimer.

(21) Appl. No.: 17/470,291

(22) Filed: Sep. 9, 2021

Related U.S. Application Data

(63) Continuation of application No. 16/862,186, filed on Apr. 29, 2020, now Pat. No. 11,122,424.

(60) Provisional application No. 62/847,691, filed on May 14, 2019.

(51) Int. Cl.
| | |
|---|---|
| *H04L 29/06* | (2006.01) |
| *H04W 12/02* | (2009.01) |
| *G06F 21/62* | (2013.01) |
| *H04W 12/033* | (2021.01) |

(52) U.S. Cl.
CPC ........ *H04W 12/02* (2013.01); *G06F 21/6245* (2013.01); *H04W 12/033* (2021.01)

(58) Field of Classification Search
None
See application file for complete search history.

(56) References Cited

U.S. PATENT DOCUMENTS

| | | | |
|---|---|---|---|
| 8,810,454 B2 * | 8/2014 | Cosman | H04W 64/00 |
| | | | 342/451 |
| 9,258,676 B2 * | 2/2016 | Beckett | H04W 4/021 |
| 9,280,559 B1 | 3/2016 | Jones | |
| 9,363,638 B1 | 6/2016 | Jones | |
| 9,396,344 B1 | 7/2016 | Jones | |
| 9,411,967 B2 * | 8/2016 | Parecki | G06F 21/6245 |
| 9,414,193 B2 * | 8/2016 | Li | H04W 4/021 |
| 9,491,577 B1 | 11/2016 | Jones | |
| 9,712,964 B2 * | 7/2017 | Sharma | H04W 4/029 |
| 9,875,251 B2 | 1/2018 | Jones | |
| 9,906,609 B2 | 2/2018 | Jones | |
| 9,906,902 B2 | 2/2018 | Jones | |
| 9,906,905 B2 | 2/2018 | Jones | |
| 9,934,368 B2 * | 4/2018 | Patton | H04L 63/102 |
| 9,961,507 B1 * | 5/2018 | Mendelson | H04W 4/029 |
| 9,980,165 B2 * | 5/2018 | Brouillette | H04W 24/10 |
| 9,986,378 B2 | 5/2018 | Jones | |
| 10,021,519 B2 | 7/2018 | Jones | |
| 10,025,800 B2 | 7/2018 | Jones | |
| 10,051,003 B2 * | 8/2018 | Sigel | H04L 63/108 |
| 10,115,277 B2 | 10/2018 | Branscomb et al. | |
| 10,121,215 B2 | 11/2018 | Branscomb et al. | |
| 10,235,726 B2 | 3/2019 | Branscomb et al. | |
| 10,237,232 B2 | 3/2019 | Jones et al. | |
| 10,375,514 B2 | 8/2019 | Jones | |

(Continued)

*Primary Examiner* — Shin-Hon (Eric) Chen
(74) *Attorney, Agent, or Firm* — NEO IP

(57) ABSTRACT

Systems, methods and apparatus for location-based services with data privacy protection. A privacy agent in network communication with a global privacy policy registry is installed on a mobile device. The privacy agent is operable to enforce rules based on privacy agreements when the mobile device is within and/or within a predetermined proximity of one or more geofences.

18 Claims, 8 Drawing Sheets

(56) References Cited

U.S. PATENT DOCUMENTS

| | | |
|---|---|---|
| 10,437,864 B2 | 10/2019 | Jones |
| 10,492,023 B1 * | 11/2019 | Gurin .................. G06F 21/602 |
| 10,547,697 B2 | 1/2020 | Jones |
| 10,547,968 B2 | 1/2020 | Jones |
| 10,582,333 B2 | 3/2020 | Jones |
| 2014/0059695 A1 * | 2/2014 | Parecki ................ H04W 12/08 |
| | | 726/26 |
| 2016/0034712 A1 * | 2/2016 | Patton ................... G06Q 50/01 |
| | | 726/28 |
| 2016/0150365 A1 * | 5/2016 | Brown ................ H04W 12/033 |
| | | 455/410 |
| 2016/0323241 A1 * | 11/2016 | Jones ................... H04W 4/029 |
| 2016/0353237 A1 * | 12/2016 | Shepherd ............... H04W 4/02 |
| 2017/0034215 A1 * | 2/2017 | Sigel .................... H04W 12/08 |
| 2017/0303082 A1 * | 10/2017 | Jones .................... H04L 67/52 |
| 2018/0007149 A1 * | 1/2018 | Gauglitz .............. H04L 67/535 |
| 2018/0025553 A1 * | 1/2018 | Bajwa .................... H04W 4/40 |
| | | 701/32.6 |
| 2018/0025649 A1 * | 1/2018 | Contreras ............ G08G 5/0069 |
| | | 701/3 |
| 2018/0152836 A1 * | 5/2018 | Milton ................ H04W 12/033 |
| 2018/0184243 A1 | 6/2018 | Jones |
| 2018/0270611 A1 | 9/2018 | Jones |
| 2018/0317043 A1 | 11/2018 | Jones |
| 2018/0350144 A1 * | 12/2018 | Rathod ............. G06Q 20/3224 |
| 2019/0057468 A1 | 2/2019 | Branscomb et al. |
| 2019/0057587 A1 | 2/2019 | Jones et al. |
| 2019/0156053 A1 * | 5/2019 | Vogel ................. G06F 21/6245 |
| 2019/0213699 A1 | 7/2019 | Branscomb et al. |
| 2019/0215298 A1 | 7/2019 | Jones et al. |
| 2019/0253835 A1 | 8/2019 | Jones |
| 2019/0349708 A1 | 11/2019 | Jones |
| 2019/0387356 A1 | 12/2019 | Branscomb et al. |
| 2020/0034377 A1 | 1/2020 | Jones |
| 2020/0162836 A1 * | 5/2020 | Beaurepaire ........ G06F 16/9537 |
| 2020/0329117 A1 * | 10/2020 | Arbatti .................... H04L 63/08 |

\* cited by examiner

SYSTEMS, METHODS AND APPARATUS FOR DATA PRIVACY PROTECTION BASED ON GEOFENCE NETWORKS

CROSS REFERENCES TO RELATED APPLICATIONS

This application is related to and claims priority from the following US patents and patent applications. This application claims priority from U.S. patent application Ser. No. 16/862,186, filed Apr. 29, 2020, which claims priority to and the benefit of U.S. Provisional Patent Application No. 62/847,691, filed May 14, 2019, each of which is incorporated herein by reference in its entirety.

BACKGROUND OF THE INVENTION

1. Field of the Invention

The present invention relates generally to systems and methods for location-based services, especially data privacy protection based on geofence networks.

2. Description of the Prior Art

With advancements of information and communications technology, data becomes more and more valuable to various businesses. Many business models are built upon data. They collect user data, share, use, and retain the collected data to generate revenue. With that, data privacy becomes an important issue. Recently, lawmakers have recognized the importance of having data privacy regulation and the need to hold companies responsible for end-user data. There are several legislations in Europe and the United States, for example, the EU General Data Protection Regulation and the California Consumer Privacy Act. Companies are working to comply with related privacy laws, and at the same time, developing technologies to enhance and protect data privacies.

Exemplary US Patent documents in the prior art include:

U.S. Pat. No. 9,961,507 for "Beacon deployment enabling location based services (LBS) in an urban or city environment" by Ehud Mendelson, filed Aug. 26, 2017 and issued May 1, 2018, describes utilizing a series of beacons deployed within an urban environment to support Location Based Services (LBS). Each beacon emits a beacon signal comprising LBS supporting information within an identification portion of the beacon signal. The emitted beacon signal is received by any mobile device, decoded, the LBS supporting information is extracted from the signal and acted upon accordingly. The information can provide the recipient with information, initiate a link to another device, initiate a LBS, etc. The information can be relayed using intermediary mobile devices. The identification portion can include information for location, beacon ID, marketing, emergencies, services, traffic, etc. A sensor can be integral with the beacon to provide additional benefits.

U.S. Pat. No. 9,414,193 for "Communicating RF fingerprint-based geofences" by Xintian Li et al., filed Oct. 17, 2013 and issued Aug. 9, 2016, describes systems, apparatus and methods for communicating and using a geofence while maintaining privacy. A geofence is based on at least one RF fingerprint. The RF fingerprints include absolute information that is transformed into a one-way matrix (A) by application of a one-way function. The absolute information may identify a transmitter (e.g., by location, address or the like). An equation $0=Ax$ (where 0 is a zero vector, A is the one-way matrix and x is a signature vector) is solved to reveal one possible solution for the signature vector (x). This signature vector (x) is communicated rather than the RF fingerprints themselves, thus obscuring the absolute information and maintaining privacy.

US Pub. No. 2018/0350144 for "Generating, recording, simulating, displaying and sharing user related real world activities, actions, events, participations, transactions, status, experience, expressions, scenes, sharing, interactions with entities and associated plurality types of data in virtual world" by Yogesh Rathod, filed Aug. 20, 2018 and published Dec. 6, 2018, describes systems and methods for virtual world simulations of the real-world or emulate real-life or real-life activities in virtual world or real life simulator or generating a virtual world based on real environment: host, at a server, a virtual world geography or environment that correspondences the real world geography or environment as a result, as the user continuously moves about or navigates in a range of coordinates in the real world, the user also continuously moves about in a range of coordinates in the real world map or virtual world; generate and access, by the server, a first avatar or representation, that is associated with a first user or entity in the virtual world; monitor, track and store, by the server, plurality types of data associated with user's real life or real life activities, actions, transactions, participated or participating events, current or past locations, checked-in places, participations, expressions, reactions, relations, connections, status, behaviours, sharing, communications, collaborations, interactions with various types of entities in the real world; receive, by the server, first data associated with a mobile device of the first user related to the first activity from the first geo-location co-ordinates or place; determine, by the server, one or more real world activities of the first user based on the first data; generate, record, simulate and update, by the server, virtual world based on said stored data, wherein updating a first avatar, that is associated with the first user or entity, in the virtual world; causing, by the server, a first avatar associated with the first user or entity, to engage in one or more virtual activities in the virtual world, that are at least one of the same as or sufficiently similar to or substantially similar to the determined one or more real world activities, by generating, recording, simulating, updating and displaying, by a simulation engine, simulation or a graphic user interface that presents a user a simulation of said real-life activities; and display in the virtual world, by the server, said real world activity or interacted entity or location or place or GPS co-ordinates related or associated or one or more types of user generated or provided or shared or identified contextual one or more types of contents, media, data and metadata from one or more sources including server, providers, contacts of user and users of network and external sources, databases, servers, networks, devices, websites and applications, wherein virtual world geography correspondences the real world geography. In an embodiment receiving from a user, a privacy settings, instructing to limit viewing of or sharing of said generated simulation of user's real world life or user's real world life activities to selected one or more contacts, followers, all or one or more criteria or filters specific users of network or make it as private.

U.S. Pat. No. 9,712,964 for "Maintaining privacy in location-based operations" by Keerat Singh Sharma et al., filed Dec. 21, 2015 and issued Jul. 18, 2017, describes various approaches enabling techniques for managing privacy with respect to location-based operations, for example by receiving point of interest (POI) data corresponding to location data such as global positioning service (GPS) data at a computing device along with various location-based rules, which when satisfied, result in attribution events being generated that indicate various characteristics associated with POIs in the POI data. The attribution events are then sent to a server without compromising the location privacy of the computing device, because the location of the computing device is not included with the attribution events.

U.S. Pat. No. 9,258,676 for "Mobile device for creating, managing and sharing location information" by Jason Christopher Beckett et al., filed Jan. 29, 2013 and issued Feb. 9, 2016, describes a method performed by a mobile device determining a current location of the mobile device, storing the current location as a breadcrumb (recorded) location of the mobile device, and performing an action with respect to the breadcrumb location when the mobile device has moved away from the breadcrumb location. The action may entail sharing the breadcrumb location with another device. Reverse geocoded address information may be provided for the breadcrumb locations.

U.S. Pat. No. 8,810,454 for "Power-aware tiered geofencing and beacon watchlists" by Stephen James Cosman, filed Oct. 13, 2011 and issued Aug. 19, 2014, describes embodiments enabling geofencing applications and beacon watch lists. A computing device with at least a first processor and a second processor identifies a set of beacons associated with a geofence. The first processor consumes less power when operating than the second processor. The first processor is provided with the identified set of beacons. In beacon watch list embodiments, the first processor detects one or more beacons proximate to the computing device, compares the detected beacons with the provided set of beacons to determine whether the computing device is within the geofence, and updates a location status based on the comparison. In tiered geofencing implementations, the computing device switches among positioning modalities based on a distance from the computing device to the geofence to save power.

U.S. patent Ser. No. 10/051,003 for "Privacy enhancements for wireless devices" by Aaron M. Sigel et al., filed Nov. 5, 2015 and issued Aug. 14, 2018, describes a wireless device can obtain a network information record from another device operating as a credential source. The network information record can include network access information for a wireless network (e.g., SSID and password) and a usage policy specifying conditions under which the wireless device should search for the wireless network (e.g., temporal and/or spatial conditions). The wireless device can implement the usage policy by searching for the wireless network only when the conditions are satisfied. In some instances, the network access information can include instructions for dynamically generating time-varying network access information, and the wireless device can use the instructions to generate network access information during a search for wireless networks.

US Pub. No. 2018/0025553 for "STEALTH MODE FOR VEHICLES" by Manpreet Singh BAJWA et al., filed Jul. 22, 2016 and published Jan. 25, 2018, describes a vehicle stores privacy settings that specify a plurality of data privacy protections to apply to vehicle communications over a network when the vehicle is in a stealth mode but not when the vehicle is in a normal mode. A telematics control unit of the vehicle indicates transition from the normal mode to the stealth mode responsive to connection of the vehicle to the network via an unknown service provider or responsive to vehicle entry to a predefined geofence area. The telematics control unit of the vehicle indicates transition from the stealth mode to the normal mode responsive to connection of the vehicle to the carrier to which the vehicle is subscribed for network service or vehicle exit from the geofence area.

US Pub. No. 2016/0034712 for "SYSTEM AND METHOD FOR EVENT-RELATED CONTENT DISCOVERY, CURATION, AND PRESENTATION" by Damien Michael Patton, filed Oct. 13, 2015 and published Feb. 4, 2016 describes a method for event detection and content surfacing, including: receiving a plurality of posts from a plurality of social networking systems; indexing each post; detecting an event within a geofence based on the post parameter values; identifying an event of interest based on the event parameter values; notifying a user account of the detected event when the detected event is determined to be of interest to the user account; aggregating event posts into a content stream for the user account; and facilitating user account interaction with and use of the event posts.

US Pub. No. 20180152836 for "SYSTEM AND METHOD TO COLLECT DEVICE LOCATION CONTEXT WITHOUT THE COLLECTION OF RAW, DETAILED LOCATION DATA AT SCALE" by Steven Milton et al., filed Nov. 29, 2017 and published May 31, 2018, describes a distributed application that shifts certain server-side operations from geolocation analytics platforms to client computing devices to enhance consumer privacy and the collection and use of potentially sensitive, personal data about an individual and their mobile device.

U.S. Pat. No. 9,411,967 for "Systems and methods for managing location data and providing a privacy framework" by Aaron D. Parecki et al., filed Aug. 26, 2013 and published Aug. 9, 2016, describes a computer-implemented method includes providing a user interface on an internet-protocol (IP) connected mobile device, the user interface configured to receive a user input corresponding to one or more data privacy parameters for geo-location data, and controlling a transferring of geo-location data to and from each of a plurality of mobile applications on the mobile device based on the user input. A change in one or more of the data privacy parameters can change how geo-location data is provided to each of the plurality of applications and can affect location data accuracy, location data reporting frequency, geo-functions, and more. The user interface can be configured to allow a user to view, manage, and delete a personal location history. Furthermore, one or more profiles can be associated with one or more of the plurality of mobile applications, where each of the one or more profiles is assigned individual data privacy parameters.

US Pub. No. 20180025649 for "UNMANNED AERIAL VEHICLE PRIVACY CONTROLS" by Dana Livonia Contreras et al., filed Mar. 31, 2016 and published Jan. 25, 2018, describes methods, systems and apparatus, including computer programs encoded on non-transitory computer storage media for unmanned aerial vehicle (UAV) flight operation and privacy controls. Based on geofence types, and UAV distance from a geofence, sensors and other devices connected to a UAV are conditionally operational. Image data collected during a UAV flight may be obfuscated by the UAV while in flight, or via a post-flight process using log data generated by the UAV.

US Pub. No. 20180007149 for "USE OF A DYNAMIC GEOFENCE TO CONTROL MEDIA SHARING AND AGGREGATION ASSOCIATED WITH A MOBILE TARGET" by Gauglitz; Wolfram, filed Jan. 5, 2016 and published Jan. 4, 2018, describes a method for processing media of a mobile target having a dynamic geofence associated with it. The method includes providing a software application, an instance of which is installed on a memory device on each of a plurality of mobile technology platforms associated with a plurality of users; receiving a request to associate captured media with the target, or to attribute the captured media to one of the plurality of users; determining whether the media was captured within the dynamic geofence; and, if the media was captured within the dynamic geofence, then granting the request, and otherwise denying the request.

US Pub. No. 9934368 for "User-generated content permissions status analysis system and method" by Damien Patton et al., filed Aug. 29, 2016 and published Apr. 3, 2018, describes a method for user-generated content privacy control, including: detecting a trigger event, identifying a post for permissions analysis, determining permissions for the post, and storing the updated permissions in a post indexing system.

US Pub. No. 9980165 for "Visual privacy systems for enterprise mobility management" by Nicholas Brouillette, filed Feb. 10, 2016 and published May 22, 2018, describes systems allowing a user to use their personal user device to perform functions in an enterprise environment in exchange for enrolling at a management server. The management server can provide a privacy component that allows the user to view a privacy profile summarizing data collection activities of the management server. The management server can dynamically build the privacy profile based on device profile and privacy settings stored on the management server. The privacy profile can be dynamically updated based on changes to privacy settings, and can also provide links for a user to see actual data that has been collected at the management server.

SUMMARY OF THE INVENTION

The present invention is directed to systems and methods and apparatus for location-based services for privacy protection. In one embodiment, the present invention provides a global privacy policy registry. Users are enabled to register their privacy agreements with website owners, app developers, hardware providers. The global privacy policy registry is updated to date. In one embodiment, a privacy agreement includes permission to collect certain user generated data, permission to disclose, transfer, or monetize certain user generated data, and conditions thereof.

In one embodiment, the present invention provides a privacy agent installed on user devices. The privacy agent is in network communication with the global privacy policy registry. The privacy agent is operable to specify and enforce privacy agreements between users and service providers for data generated on user devices. In one embodiment, a regulating device is installed with a privacy agent operable for defining a geofence for a space, specify rules within the geofence, and enforce the rules on user devices in the geofence.

In one embodiment, the present invention includes a system for providing location-based services, including at least one network device, a database, a global privacy policy registry, and a privacy agent platform configured for network communication, wherein the database is configured to store a space-network model (SNM) binding Internet Protocol (IP) addresses and physical locations, wherein the privacy agent platform is operable to define at least one geofence for a specified location based on the SNM and specify a set of privacy rules within the at least one geofence, wherein the database is configured to store the at least one geofence and the set of privacy rules for the location-based services, wherein the global privacy policy registry is configured to store the set of privacy rules and the at least one geofence, and wherein the at least one network device is operable to implement the set of privacy rules for the location-based services within the at least one geofence for the specified location.

In another embodiment, the present invention includes a method for providing location-based services, including providing a privacy agent platform, at least one database, and a global privacy policy registry configured for network communication with a multiplicity of network devices, wherein the at least one database is configured to store a space-network model (SNM) binding Internet Protocol (IP) addresses and three-dimensional (3D) physical locations, the privacy agent platform defining a multiplicity of geofences for a specified location based on the SNM model and specifying a set of privacy rules for the location-based services within the multiplicity of geofences, the at least one database storing the multiplicity of geofences, the global privacy policy registry storing the set of privacy rules for the location-based services and the multiplicity of geofences, the multiplicity of network devices retrieving information related to the multiplicity of geofences and the set of privacy rules for the location-based services from the privacy agent platform, the at least one database, and/or the global privacy policy registry, and the multiplicity of network devices implementing the set of privacy rules for the location-based services within the multiplicity of geofences.

In yet another embodiment, the present invention includes an apparatus for providing location-based services, including a privacy agent platform, a database, and a global privacy policy registry, wherein the privacy agent platform, the database, and the global privacy policy registry are configured for network communication, wherein the privacy agent platform is configured to create at least one geofence corresponding to a specified location and at least one set of privacy rules corresponding to the at least one geofence, wherein the database is operable to store geofence data associated with the at least one geofence, a space-network model (SNM) biding Internet Protocol (IP) addresses and three-dimensional (3D) physical locations, wherein the global privacy policy registry is operable to store the at least one set of privacy rules and the at least one geofence, wherein the privacy agent platform is operable to enforce the at least one set of privacy rules and enable the location-based services on a multiplicity of network devices, wherein enforcement of the at least one set of privacy rules and enablement of the location-based services is based on the multiplicity of network devices geographic location within the at least one geofence.

These and other aspects of the present invention will become apparent to those skilled in the art after a reading of the following description of the preferred embodiment when considered with the drawings, as they support the claimed invention.

DETAILED DESCRIPTION

Figure 1:
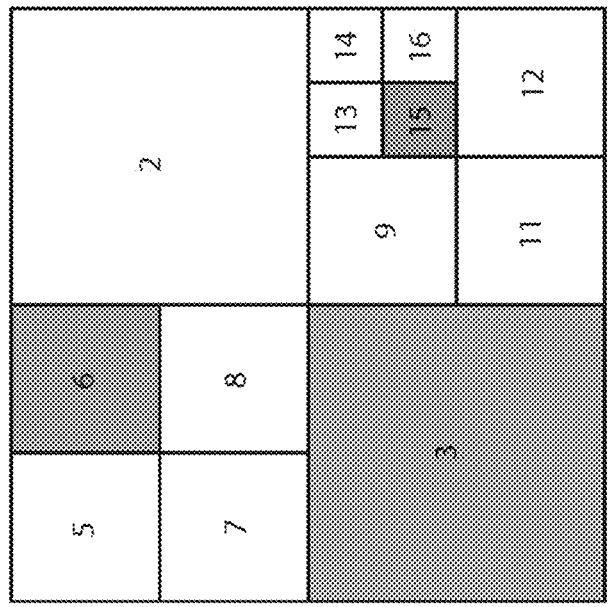
FIG. 1 is a quadtree graph.
Figure 1:
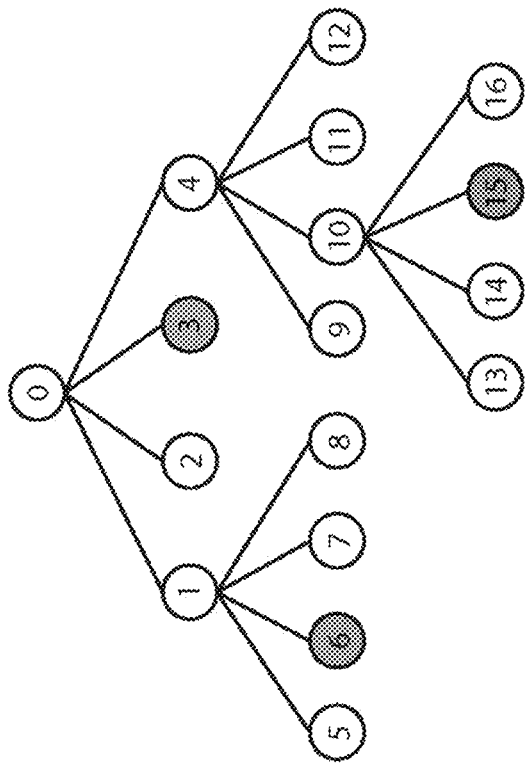

Priority documents including U.S. Pat. Nos. 9,363,638, 9,280,559, 9,396,344, and copending U.S. patent application Ser. Nos. 14/745,951, 14/755,669, 14/811,234, 14/953,485, 15/213,072, 15/496,602 are incorporated herein by reference in their entirety.

Space-Network Model

The present invention provides a space-network model comprised of a combination of an Internet Protocol (IP) network, a directed graph, an optional topological space, and a physical topography and/or elements of a complete geodetic system. A directed graph can be a strip tree, a quadtree, an octree, a b-tree, an r-tree, a weighted graph or a cyclic graph. A topological space can be a manifold (e.g. torus, sphere, Euclidean space), a simplicial complex, or a Hamming space. A complete geodetic system can be the World Geodetic System (WGS84).

In one embodiment, the present invention includes a system for providing location-based services, including at least one network device, a database, a global privacy policy registry, and a privacy agent platform configured for network communication, wherein the database is configured to store a space-network model (SNM) binding Internet Protocol (IP) addresses and physical locations, wherein the privacy agent platform is operable to define at least one geofence for a specified location based on the SNM and specify a set of privacy rules within the at least one geofence, wherein the database is configured to store the at least one geofence and the set of privacy rules for the location-based services, wherein the global privacy policy registry is configured to store the set of privacy rules and the at least one geofence, and wherein the at least one network device is operable to implement the set of privacy rules for the location-based services within the at least one geofence for the specified location, wherein the global privacy policy registry is updated in real-time or near-real time, wherein the privacy agent platform is operable to provide at least one smart contract or at least one privacy agreement to the at least one network device, wherein the privacy agent platform is operable to create an encrypted channel for data transmission in and/or out of the at least one geofence, wherein the privacy agent platform is operable to disable the at least one network device and/or at least one mobile application stored on the at least one network device from collecting location data corresponding to the at least one network device when the at least one network device is located within the at least one geofence via the set of privacy rules, wherein the privacy agent platform is operable to generate a false location data feed for the at least one network device via the set of privacy rules, and wherein the privacy agent platform is operable to disable network and/or cellular communications when the at least one network device is located within the at least one geofence and/or within a specified distance from the at least one geofence via the set of privacy rules.

In one embodiment, each geofence includes a corresponding domain name. A global privacy registry is operable to store both the geofence and the corresponding domain name. In addition, the global privacy registry is operable to indicate whether the domain name is owned, managed, controlled, and/or operated as part of a new asset estate. This enables the virtual space corresponding to the geofence and/or the corresponding domain name to have a separate owner from an associated physical space, corresponding to the geofence and/or the corresponding domain name.

In another embodiment, the present invention includes a method for providing location-based services, including providing a privacy agent platform, at least one database, and a global privacy policy registry configured for network communication with a multiplicity of network devices, wherein the at least one database is configured to store a space-network model (SNM) binding Internet Protocol (IP) addresses and three-dimensional (3D) physical locations, the privacy agent platform defining a multiplicity of geofences for a specified location based on the SNM model and specifying a set of privacy rules for the location-based services within the multiplicity of geofences, the at least one database storing the multiplicity of geofences, the global privacy policy registry storing the set of privacy rules for the location-based services and the multiplicity of geofences, the multiplicity of network devices retrieving information related to the multiplicity of geofences and the set of privacy rules for the location-based services from the privacy agent platform, the at least one database, and/or the global privacy policy registry, and the multiplicity of network devices implementing the set of privacy rules for the location-based services within the multiplicity of geofences, wherein the multiplicity of geofences are three-dimensional (3D) and further including the privacy agent platform providing a plurality of smart contracts corresponding to a set of terms and conditions for data collection for the multiplicity of network devices, further including the privacy agent platform providing a plurality of smart contracts corresponding to the set of privacy rules, wherein the plurality of smart contracts includes transactions executed with cryptocurrency, wherein the set of privacy rules are consistent with at least one privacy agreement between the multiplicity of network devices and at least one service provider for the multiplicity of network devices, wherein the specified location is a house, wherein the multiplicity of geofences includes a geofence around the house, and further including the privacy agent platform enabling or disabling location data corresponding to the multiplicity of network devices while the multiplicity of devices are located within the geofence around the house, and wherein the set of privacy rules includes a permission to collect network-device generated data, a permission to disclose network-device generated data, a permission to transfer network-device generated data, and/or a permission to monetize network-device generated data.

In yet another embodiment, the present invention includes an apparatus for providing location-based services, including a privacy agent platform, a database, and a global privacy policy registry, wherein the privacy agent platform, the database, and the global privacy policy registry are configured for network communication, wherein the privacy agent platform is configured to create at least one geofence corresponding to a specified location and at least one set of privacy rules corresponding to the at least one geofence, wherein the database is operable to store geofence data associated with the at least one geofence, a space-network model (SNM) biding Internet Protocol (IP) addresses and three-dimensional (3D) physical locations, wherein the global privacy policy registry is operable to store the at least one set of privacy rules and the at least one geofence, wherein the privacy agent platform is operable to enforce the at least one set of privacy rules and enable the location-based services on a multiplicity of network devices, wherein enforcement of the at least one set of privacy rules and enablement of the location-based services is based on the multiplicity of network devices geographic location within the at least one geofence, wherein the at least one set of privacy rules includes at least one smart contract, wherein the at least one smart contract specifies terms and conditions for data collection, wherein the SNM is a separate virtual property from the 3D physical location corresponding to the SNM, wherein the privacy agent platform is operable to identify a geographic location corresponding to the multiplicity of network devices using a unique SNM identifier, wherein the unique SNM identifier is updated in real-time or near-real time, wherein the privacy agent platform is operable to enforce the at least one set of privacy rules against a multiplicity of service providers during a predetermined time period and in a predetermined geographic location, wherein the predetermined time period and the predetermined geographic location are specified in the at least one set of privacy rules, wherein the at least one set of privacy rules includes a permission to collect network-device generated data, a permission to disclose network-device generated data, a permission to transfer network-device generated data, and/or a permission to monetize network-device generated data, and wherein the at least one set of privacy rules includes security and/or privacy settings corresponding to the multiplicity of network devices, at least one application installed on the multiplicity of network devices, and/or web browsers installed on the multiplicity of network devices.

The combination of the location and the network is inherent to the space-network model of the present invention. The space-network model is a unique structure built by assigning a unique IP address to a physical location, or from another perspective, the space-network model is given dimension through distribution of IP addresses inside of a mathematical construct. A physical place like a planet can then be placed inside of the space-network model.

In one embodiment of the present invention, the space-network model comprises four elements, including a topographical structure, a directed graph, a reference datum, and an Internet Protocol (IP) network. Preferably, the IP network is IPv6 or IP future versions beyond IPv6. A topographical structure can be constructed from measurements of the surface of a planet, a tectonic plate, a geometric solid. A topological space such as a torus or cylinder can be chosen to accommodate a map projection.

Figure 2:
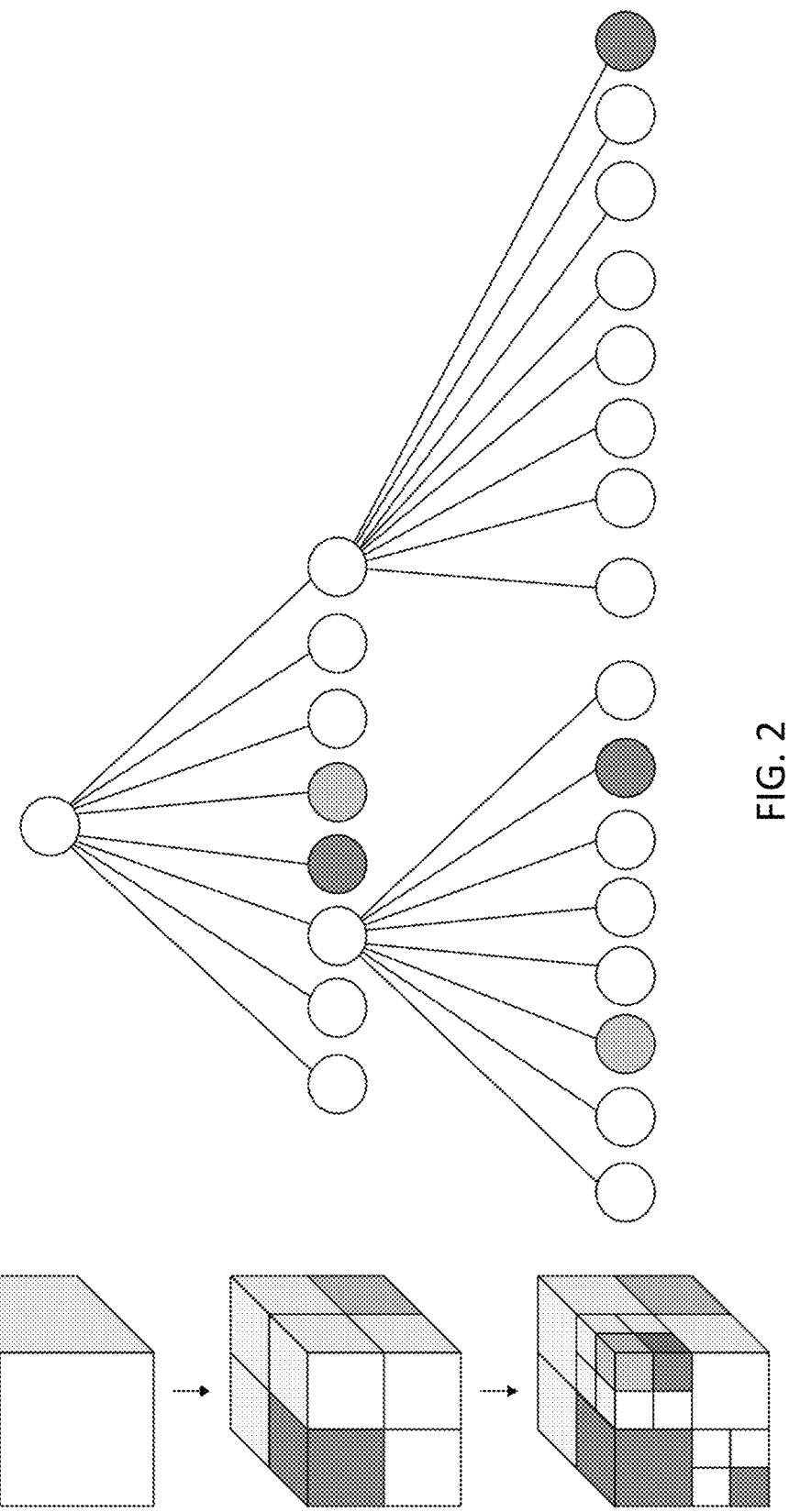
FIG. 2 is an octree graph.

FIG. 1 illustrates a quadtree graph. FIG. 2 illustrates an octree graph. Quadtrees and octrees can be generalized to arbitrary dimensions. A coordinate in N-dimensional Euclidean space always sits in an N-dimensional cube represented by a sequence of digits between 0 and $2^n-1$. An N-dimensional manifold is projected into a lower dimensional Euclidean space. For example, a 3D sphere has a 2D map projection.

A reference datum is selected from a prime beacon, a center of mass, a center of gravity, a center of Global Navigation Satellite System (GNSS) constellation, a fixed point computed by reference to an astronomical object, a natural or manmade satellite, or any other astronomical object, by way of example but not limited to: a star, a comet, an asteroid, and/or a distant pulsar.

A prime beacon is a manmade beacon that transmits its own physical location via information encoded on an energy source. The energy source may be a form of radiant energy (e.g., electromagnetic) or mechanical energy (e.g., sonic). The information is encoded as a space-network identifier. The space-network identifier emitted from the prime beacon is used as the reference datum to establish a space-network frame.

Figure 3:
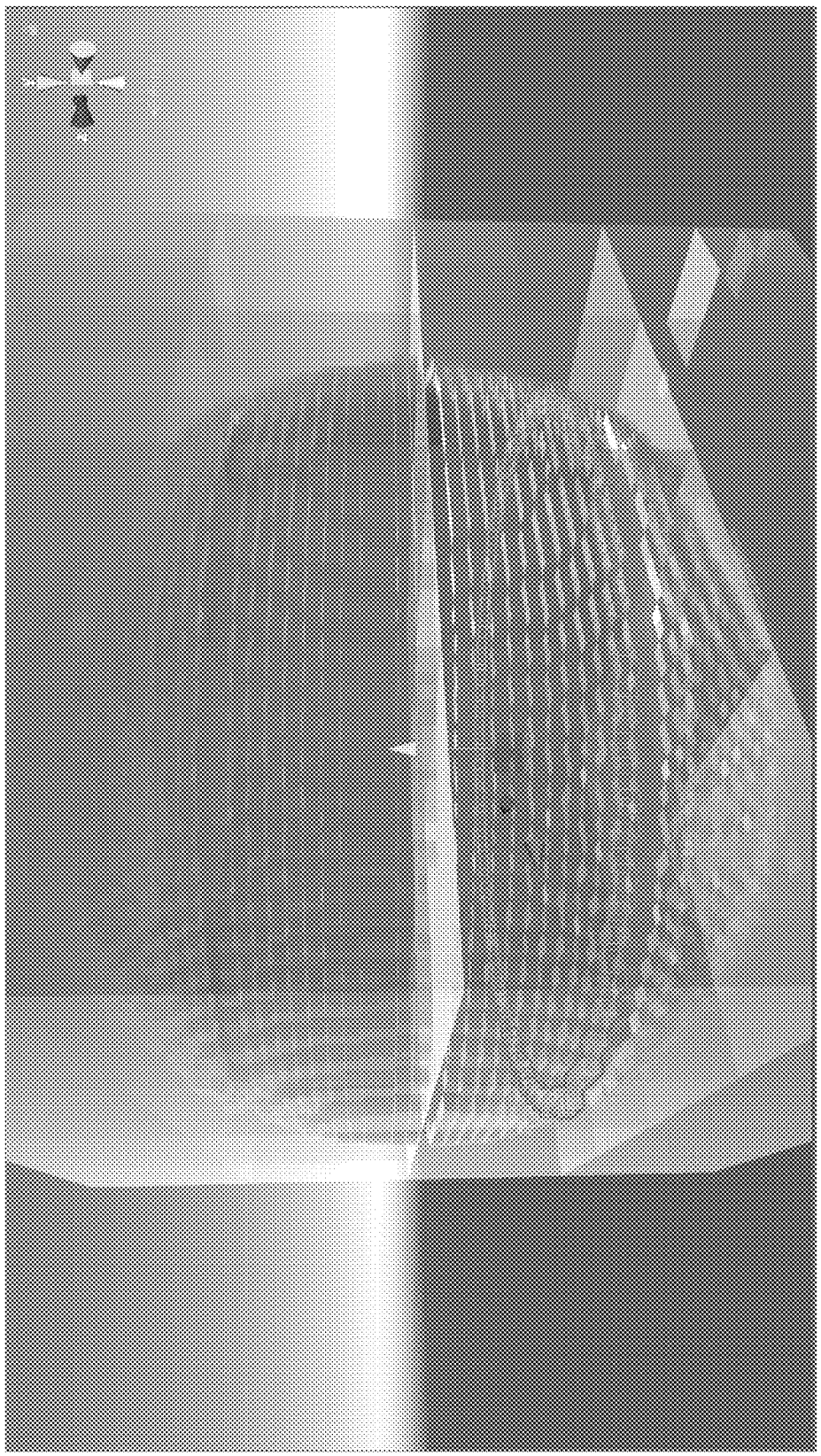
FIG. 3 is visualization in the Unity game engine of a sphere embedded as voxels of a voxelized cube in a Unity world space.

FIG. 3 is a visualization in the Unity game engine of a sphere embedded as voxels of a voxelized cube in a Unity world space. The embedding is obtained by associating a longitude and latitude coordinate to a node in an octree, with that node corresponding to a voxel of the voxelized cube in the Unity world space. The embedding can be augmented by perturbations and distortions so as to provide an embedding of a shape more closely representing that of the Earth; in general, any three-dimensional surface can be embedded similarly in the voxelized cube. A node in the octree, and its corresponding voxel, is represented as an IP network address in a space-network model. The voxel corresponding to each node in the octree can be divided into subcomponents. For example, each face of the voxel can be subdivided into tiles, each tile corresponds to a node in a quadtree, and that node, in turn, is represented as an IP network address in a space-network model.

As will be understood by one of ordinary skill in the art, the Unity world space does not have the same dimensions as the real world since the earth is not a perfect sphere. In other words, the Unity world space is more perfect mathematically. Thus, physics models in the real world are built in the Unity world space for use with the present invention. The illustrated Unity game engine world space provides a coarse representation of a space-network model of the present invention including intersections of datum that gives start in some universe. So, modeling is done in such a world space. A ring illustrated in FIG. 2 is provided to test navigability around a line of latitude for IPv6 aggregation. Each voxel (cube) in FIG. 2 is navigable as an octree and each plane in FIG. 2 is navigable as a quadtree similar to zoom level projections in the present invention.

Reference Frames

Reference frames are independent blocks of a space-network model and are used for any purpose independently of other frames. Reference frames may be provided at any depth of the space-network model. Each reference frame of the present invention has its own multi-dimensional orientation and can be scaled, translated or rotated for any purpose. In one embodiment, a reference frame has an independent reference datum. In another embodiment, a reference frame is anchored to a parent frame.

Figure 4:
FIG. 4 is an illustration of the space-network model for Australian continent synchronized with the movement of the land mass according to the present invention.

For example, due to tectonic shift, the entire continent of Australia has moved 1.5 meters north over the past 22 years as well as rotated relative to a Geographic Coordinate System (GCS) and surrounding plates. Thus, the space-network model for a local area of Australia is translated and rotated to remain synchronized with the movement of the land mass according to the present invention, as illustrated in FIG. 4.

While the space-network model of the present invention is referred to as reference frames, coordinate systems, map projections and datums that relate to the earth, this space-network relationship is applicable to any dimensional spaces. Dimensional spaces include higher order mathematical structures, geometrical or otherwise.

The earth is not a perfect sphere, it flexes and flows under the influence of tides, gravity and interactions between the earth's mantle and crust. As a coordinate system, the space-network model of the present invention in the context of the geometry of the earth is superior to the GCS in that it allows for localized portions of the space-network model to be decoupled from the whole, thereby allowing parts of the planet to drift, rotate and scale independently within a reference frame. In one embodiment, localized frames of the space-network model are linked to another frame by a pivot point. The pivot point is generally an anchor point at the center of mass or geometric centroid depending on the number of dimensions. In one embodiment, linked frames of the space-network model use dissimilar dimensions, topologies or IP networks, but do not require a datum as they may inherit a datum from a parent frame.

Space-Network Model (SNM)-Based Network Protocol

In the field of computer networking, a network topology describes various arrangements of network nodes (e.g., hosts, routers, switches, and other network connected devices). Network topologies include, for example but not for limitation, busses, rings, stars, and meshes.

For decades, network engineers have been striving to create a mapping of abstract network topologies to the physical world. Many geo-routing and geo-casting protocols have been developed in this pursuit. These protocols vary in methods, but most if not all are prone to gross error through misconfiguration when placed in the hands of network administrators. The geo-casting protocols have failed in the past as they all try to build an ephemeral model that glues geographical topography and network topology together, but the network topology in particular places cannot be verified based on observations and assertions.

The space-network model of the present invention obsoletes these protocols through a simple truth that if a location is known, then the network at that location is known. Conversely, if a network that a distant network node is utilizing or advertising is known, then the exact location for the distant network node is known. This linkage between a network and a location is achieved through the distribution of IP addresses in a topological space. A reference datum is then used to pin the topological space to a topography.

The present invention also provides a network protocol based on the space-network model. The space-network model (SNM)-based network protocol of the present invention represents a fusion of a geographical topography, an IP network and that IP network's topology. It is also operable to leverage and extend beacon-based location services. The SNM-based network protocol of the present invention provides for a fencing agent to derive automatically an exact 3D geographical location using an IPv6 address from the space-network model. Conversely, given a 3D geographical location, the Fencing Agent automatically determines the corresponding IPv6 address using the space-network model.

In one embodiment, the space-network model is applied to the geographic 3D surface of the earth. Every location, for example one room in a building, has a finite number of IP addresses assigned to it in the space-network model of the present invention, thereby automatically creating an IP network (or IP networks) using IPv6 or later version that associates every locational point with its unique IPv6 address. Just as each room of the building is aggregated into a larger structure, in the present invention IP networks corresponding to different locations are aggregated into a supernet, also known as prefix aggregation or route summarization. The aggregation in networking terms is like an address on an envelope. For example, when a zip code is provided, the location area associated with the zip code is known and provides an initial basis for routing the envelope toward a specific address. From that zip code as an initial basis for routing the envelope, adding a street name, and then a house or building number corresponding to a more particular location on the street, the exact location is known or established by the complete address, and the envelope may be delivered accurately to the location corresponding to the complete address.

The present invention includes a mechanism to constantly produce and populate the space-network model database that contains binding between the IP addresses and their corresponding locations, which are inextricably linked together. This mechanism is superior to geocoding or GeoIP data sets which leverage data mining exercises based on zip codes, cities, and/or countries.

Given an IP address, the location information is known based on the space-network model in the present invention. Based on this fundamental truth, the present invention allows for automatically addressing physical space at near real time speeds with a precision of more than 41 trillion IP addresses per atom in the earth, i.e., each IPv6 address corresponds precisely to a 3D location on the earth's surface. Notably, the 3D location can include a dimensional location component above the surface or below the surface of the earth, with a precision of about 10 to 20 addresses along a radius of a proton. The precision provided by the present invention systems and methods using the space-network model (SNM)-based network protocol exceeds what is required in most practical applications for mapping and location-based services. However, the present invention may be further applied to medical imaging or to medical applications to address delivery of medications or treatments at a cellular level, or molecular level, or even more precise.

In one embodiment of the present invention, a device, knowing its location, is operable to make a request via Dynamic Host Configuration Protocol (DHCP), Address Resolution Protocol (ARP), Neighbor Solicitations, Neighbor Advertisements, Router Solicitations, Router Advertisements, or Redirects, for an assignment or assertion of use of an IP address representing its location within a space-network model.

Upon the assignment or acquisition of a new IP network identity, the device is operable to announce the use of this IP address through the course of ARP, directed communication, broadcast, multicast, anycast, or other common uses of IP protocols. Anycast is a network addressing and routing methodology in which datagrams from a single sender are routed to the topologically nearest node in a group of potential receivers, though they may be sent to several nodes, all are identified by the same destination address.

Once becoming aware of the IP addresses currently in use by their network peers, all the other network devices are operable to compute the exact positions of their network peers within the space-network model, thereby knowing the exact 3D positions of their network peers.

Other nearby routers and switches within a physical topography associated with an IP network are operable to check assertions of devices by sending a request that addresses for the devices are indeed within a known or physically possible region. Impossible or unlikely requests could be denied as a security or route optimization measure.

The network protocol provided by the present invention are opportunistic protocols based on zero-configuration networking (zeroconf). Zeroconf is a set of technologies that automatically creates a usable computer network based on the Internet Protocol Suite (TCP/IP) when computers or network peripherals are interconnected. It does not require manual operator intervention or special configuration servers. Apple TV, Chromecast, Airplay are all based on zeroconf.

The SNM-based network protocol provided by present invention provides a back channel between beacon-emitting devices in network connection or routers either having access to GPS or not. The beacon-emitting devices and routers, configured for the SNM-based network protocol, are operable to measure distance between their network peers. The SNM-based network protocol is operable on multiple channels in multiple types of networks including wired and wireless.

In one embodiment of the present invention, some location information encoded in corresponding IP addresses are verified, and some location information are not verified. The present invention enables devices to refine one another's or its own location over time based on emitting-variance-covariance-based estimations or other estimations of precision. The location information is refined automatically and continuously in real time.

Lifecycle for Location Accuracy Augmentation

In one embodiment of the present invention, a first router configured with GPS in a datacenter is operable to initialize a loopback interface with an IPv6 address in which a block of address space is encoded with a physical location of the first router based on the space-network model in the present invention.

The second router in the same datacenter discovers the first router as a network peer over a connected network medium. Upon discovering a space-network identifier and accuracy value from the first router, the second router is operable to use time-distance metrics from its connected interfaces using the built-in cable diagnostics or Time Domain Reflectometry (TDR) to estimate cable lengths and approximate its proximity to the first router.

A third router in the same datacenter discovers its location from a beacon configured for the SNM-based network protocol of the present invention. This third router also joins as a network peer. The second router now has two sources of location and two sources of distance.

Every router is operable to receive information from a new source to further refine its location and in turn provide more accurate augmentation to its peers. If a router does not have any source of location independent of an Ethernet network, for example, a GPS, Wi-Fi receiver, etc, the router is still able to learn the cable lengths between the device and other devices over the Ethernet network.

Beacons Configured for the SNM-Based Network Protocol

According to the present invention, a beacon is configured for the SNM-based network protocol and transmits its own physical location via information encoded on an energy source. The energy source may be a form of radiant energy (e.g., electromagnetic) or mechanical energy (e.g., sonic) based on a radio source, light source, sonic source or ultrasonic source. The information is encoded as a space-network identifier.

Each beacon configured for the SNM-based network protocol is operable to use many sources of location data to establish or refine its own location or its peer's location. These sources include but not limited to other beacons, announcements from network peers, time/distance ranging with other radiant or mechanical energy sources, ground based or satellite-based location services such as GNSS.

An accuracy value is also encoded with a space-network identifier. The accuracy value represents a beacon's confidence level in the precision of the location that it is advertising within the space-network model. The accuracy value is computed through consideration and comparison of the many sources of location augmentation that the beacon is exposed to.

The only exception is a prime beacon. A prime beacon has a fixed location in a given space-network model and acts as a reference datum for the given space-network frame.

At the time of the present invention, all commercially available radio beacons, for example but not for limitation, iBeacon (Apple), Eddystone (Google), and AltBeacon (Various Vendors), can be configured for the SNM-based network protocol by adding a single chip implementation of the SNM-based protocol provided by the present invention.

Each beacon is operable to advertise its location information by emitting binary space-network identifiers continuously. The location information is encoded in the address portion of a space-network identifier, and an accuracy value is encoded in the metadata portion of the space-network identifier. The space-network identifier is another key similar to a hardware address or a Media Access Control (MAC) address to identify an entity within a space-network model.

In one embodiment, a workflow for installing and initializing one of these commercially available beacons includes the following steps: affix a beacon to a physical place; establish communication between the beacon with a smartphone containing a Fencing Agent enabled application provided by the present invention; the Fencing Agent enabled application configures the beacon based on the location information and a corresponding accuracy value from the Fencing Agent enabled application. The beacon is then operable to continuously transmit a space-network identifier encoded with its location information and an accuracy value.

In one embodiment, a beacon configured for the SNM-based network protocol is placed on an antenna outside a building. The antenna is a survey grade dual antenna for land surveys with sub-centimeter GPS precision. Other beacons inside the building are operable to learn their locations from each other based on triangulation and trilateration.

Routing Engines Configured for the SNM-based Network Protocol

Similar to a beacon configured for the SNM-based network protocol, a routing engine is configurable for the SNM-based network protocol, and is operable to establish and/or refine the location information associated with its IP address from inside the firmware of the routing and switching hardware. If a router with a routing engine configured for the SNM-based network protocol moves, the router is operable to relearn its location by observing the network it is on and/or any network-connected beacon configured for the SNM-based network protocol over zeroconf or other similar discovery mechanism.

Many datacenters have GPS feed at least for accurate clock information and many vendors of routers and switches have the ability to connect to a GPS based source of clock. A network device such as a router with a routing engine configured for the SNM-based network protocol is operable to take the same GPS feed, derive location information out of standard National Marine Electronics Association (NMEA) messages from the GPS feed, and use link state announcements (LSA) to make authoritative assertions that a network is available in a place, and a place is available in a network. That is, the SNM-based network protocol is a modern internal routing protocol which uses LSA to advertise the availability of a particular IP network on a particular router or switch interface or port. As routers interact with one another through zeroconf or similar advertisements and/or communication with remote peers, they are operable to augment each other's locational precision.

Figure 5:
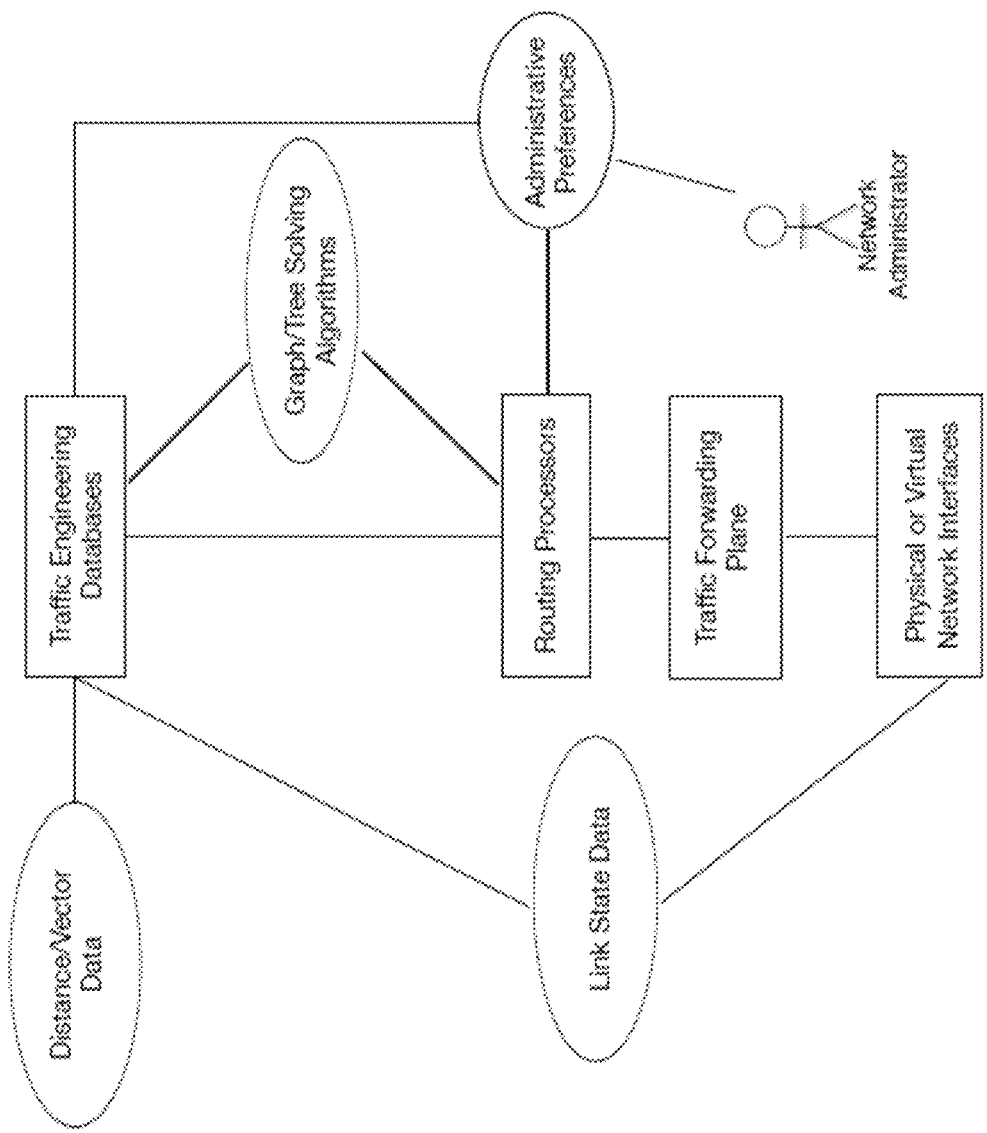
FIG. 5 is a diagram of general routing and switching architecture.

FIG. 5 is a diagram of general routing and switching architecture. Distance/vector data and link state data are collected to traffic engineering databases. The traffic engineering databases communicate with routing processors, both of which are configured with graph or tree solving algorithms. Administrative preferences for the traffic engineering databases and/or the routing processors may be entered by a network administrator. The routing processors are configured with hardware and/or software. A traffic forwarding plane makes decisions on what to do with data arriving in the form of packets, frames or other protocol data units. The data is then transmitted from the traffic forwarding plane to a physical or virtual network interface. When the physical or virtual network interface changes, link state data changes, and traffic engineering database is updated based on the link state data change.

In a space-network model provided by the present invention, a position always references both a physical location and an address block within a IP address. A space-network model provides a mechanism to navigate the IP addresses and the physical world in a consistent manner, and allows for interchanges between directed graphs, projections and physical datums.

Any fragment of a protocol data unit (PDU) at any layer of an Open System Interconnection (OSI) model can be used to reference a position in the space-network model provided by present invention. This includes non-prescribed uses of hardware identifiers such as a MAC address.

Systems configured for the SNM-based network protocol are operable to act as ground based augmentation (GBA) to GNSS/GPS. Some critical infrastructure is dependent on the precise timekeeping and geolocating of GNSS/GPS, and some critical infrastructure is only dependent on the precise timekeeping of GNSS/GPS. According to the present invention, the systems configured for the SNM-based network protocol are capable of keeping critical infrastructure running in an event of a complete GNSS failure based on location-based aggregation. Some critical infrastructure is only dependent on the precise timekeeping of GNSS.

A blockchain is a distributed transactional ledger. In one embodiment, the blockchain is used as a tamper-proof and corruption-proof record of a geofence ownership, a land deed and/or a smart contract related to the land or geofence. In one embodiment, an IPv6 address in a space-network model is encoded with metadata information, such as a blockchain ID, a transaction ID, and/or a hash in the blockchain for a transaction.

In one embodiment, a web server configured for the SNM-based network protocol in the present invention is operable to learn an exact position of every client by knowing each client's IP address. Thus, the web server log contains the exact position of every client.

In one embodiment, drones are configured according to the present invention to emit space-network identifiers continuously in a form of IP addresses encoded with location information and corresponding accuracy values. When the drones are in a mesh network, they are operable to learn and update each other's position and in real time avoid collision.

In one embodiment, the present invention enables network policies for restricting or allowing network resources based on their exact positions.

In one embodiment, network routing policies are expressed as entitlements on geofences comprised of points within a space-network model, and the behavior of network routing and switching equipment can be further refined by such network routing policies.

The present invention provides systems and methods for advertising location information. A multiplicity of devices is constructed and configured for network-based communication within a geofence. Each of the multiplicity of devices comprises a processor, a transmitter, and a receiver. Each of the multiplicity of devices is configured to emit a unique space-network identifier continuously within the geofence. The unique space-network identifier comprises a binding of an IP address and physical location information for each of the multiplicity of devices. Each of the multiplicity of devices is configured to receive space-network identifiers from its peers within the geofence; and update the unique space-network identifier based on space-network identifiers received from its peers within the geofence. The geofence is defined in a space-network model binding Internet Protocol (IP) addresses and physical locations.

The unique space-network identifier comprises an IP number portion encoded with physical location information for a device emitting the unique space-network identifier. The unique space-network identifier comprises a network portion representing a network that a device emitting the unique space-network identifier is in, and the network portion is encoded with location information for the network that a device emitting the unique space-network identifier is in. The unique space-network identifier comprises a metadata portion encoded with an accuracy value representing a confident level in a precision of the location information for the device emitting the unique space-network identifier. Each of the multiplicity of devices is operable to augment the accuracy value in the unique space-network identifier emitted from each of the multiplicity of devices. The multiplicity of devices is movable, and operable to relearn their location and update the unique space-network identifier based on space-network identifiers received from its peers. The multiplicity of devices is selected from beacons, routers, switches, hosts, and other network connected devices.

Telecom Carrier Infrastructure Management

The present invention is applicable to manage telecom carrier infrastructure. In one embodiment, a geofence in the form of a 2D polygon or 3D volume is defined in a space-network model for an area in a space-network model for certain activities and/or policies in a certain area, such as scheduled installation, maintenance, net neutrality control, traffic policies, etc. In another embodiment, a geofence is drawn around an area that is predicted to be impacted by a storm or other weather event for preemptive traffic restoration, and optimization of customer and public service. In another embodiment, a geofence is defined indicating areas where certain types of service are possible or available.

In these embodiments, specific entitlements are defined for the defined geofence. For example, the entitlements include an intent to route traffic inside the geofence to another part of a stakeholder's own network or a competitor's network outside the geofence; bulk customer migrations of products or pricing plans; telephone number plans; aggregation strategies for IP number space; testing/staging areas for changes of routing/switching configurations; areas not accepting traffic from internal or external peers; and tariff related concerns. The entitlements express routing policies that tune the quality of service (QoS) and/or priority of certain types of traffic inside and/or outside the defined geofence. Note that the entitlements are referred to as requirements and capabilities from the geofence owner and device/application providers' perspectives respectively. Namely, a network carrier expresses requirements for geofence, and a network device/application complies with the requirements by matching their capabilities to the requirements.

Figure 6:
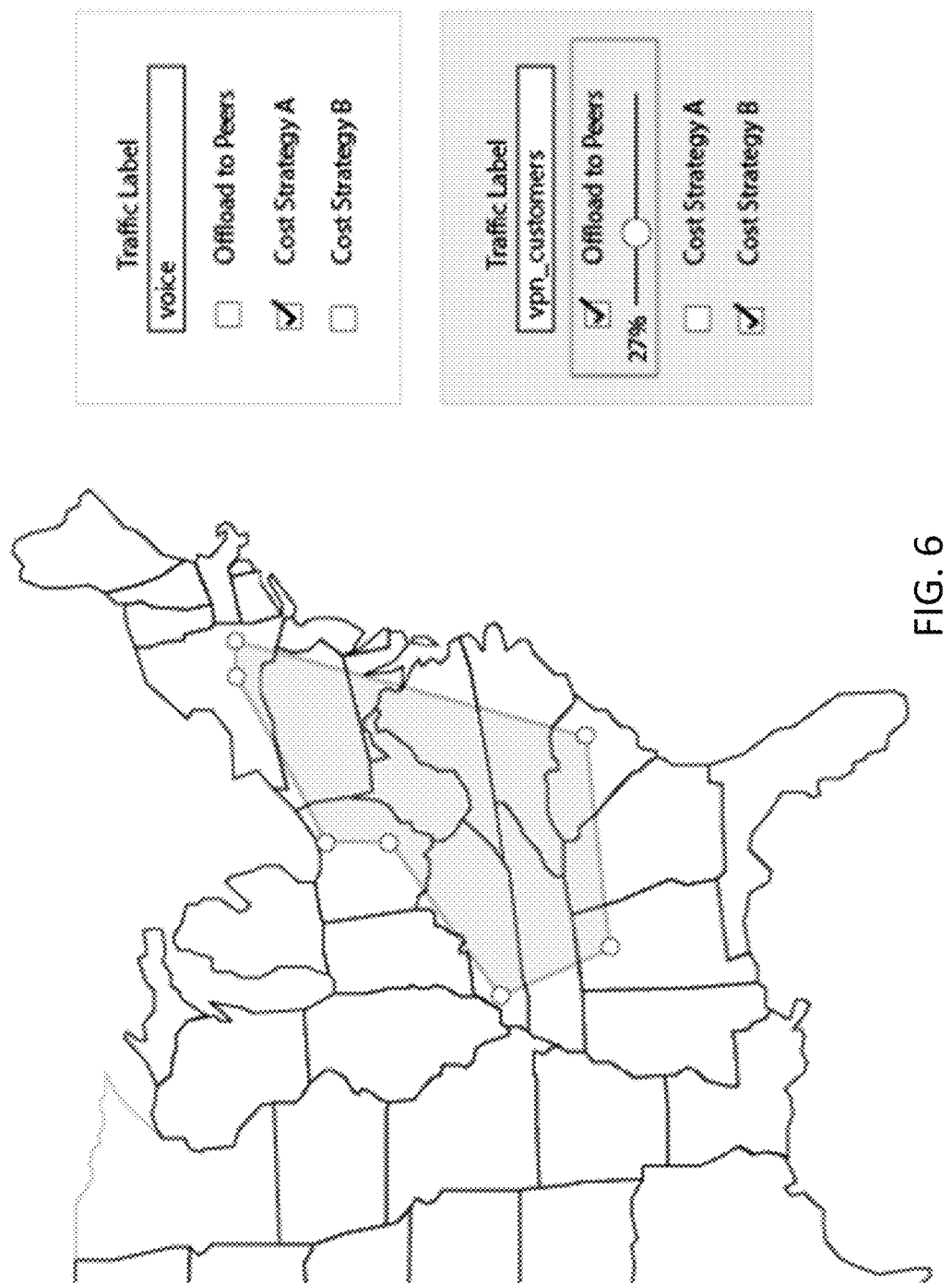
FIG. 6 illustrates a geofence defined for telecom carrier infrastructure in an area.

FIG. 6 illustrates a geofence is defined for telecom carrier infrastructure in an area. Once a geofence for an area is defined and entitlements are applied within a global or private registry, a network device configured for the SNM-based network protocol is operable to intentionally build a situational understanding of where that area is and how the network device and its peers relate to that area. The network device is operable to comply with the entitlements in order to manipulate its routing and switching behavior. The network device is further operable to update its routes and policies based on updated entitlements of the geofence.

Power System Infrastructure Management

The power grid infrastructure, including power plants, substations, distribution and transmission lines, is surveyed in detail and their locations are exactly known. At least one IPv6 address can be assigned to each equipment and along transmission lines at millimeter level. Each IPv6 address is encoded with the location information in the IP number space and grid topology information (e.g., switches, transformers, capacitors, connections), phase data on the power grid, and other relevant information in the metadata space.

In one embodiment, a geofence is defined for a certain part of a power grid infrastructure, for example, a power plant, a substation or a section of a transmission or distribution line. Specific entitlements are defined for the geofence for different purposes, for example, inspections and maintenance, storm damage assessment, and security.

Figure 7:
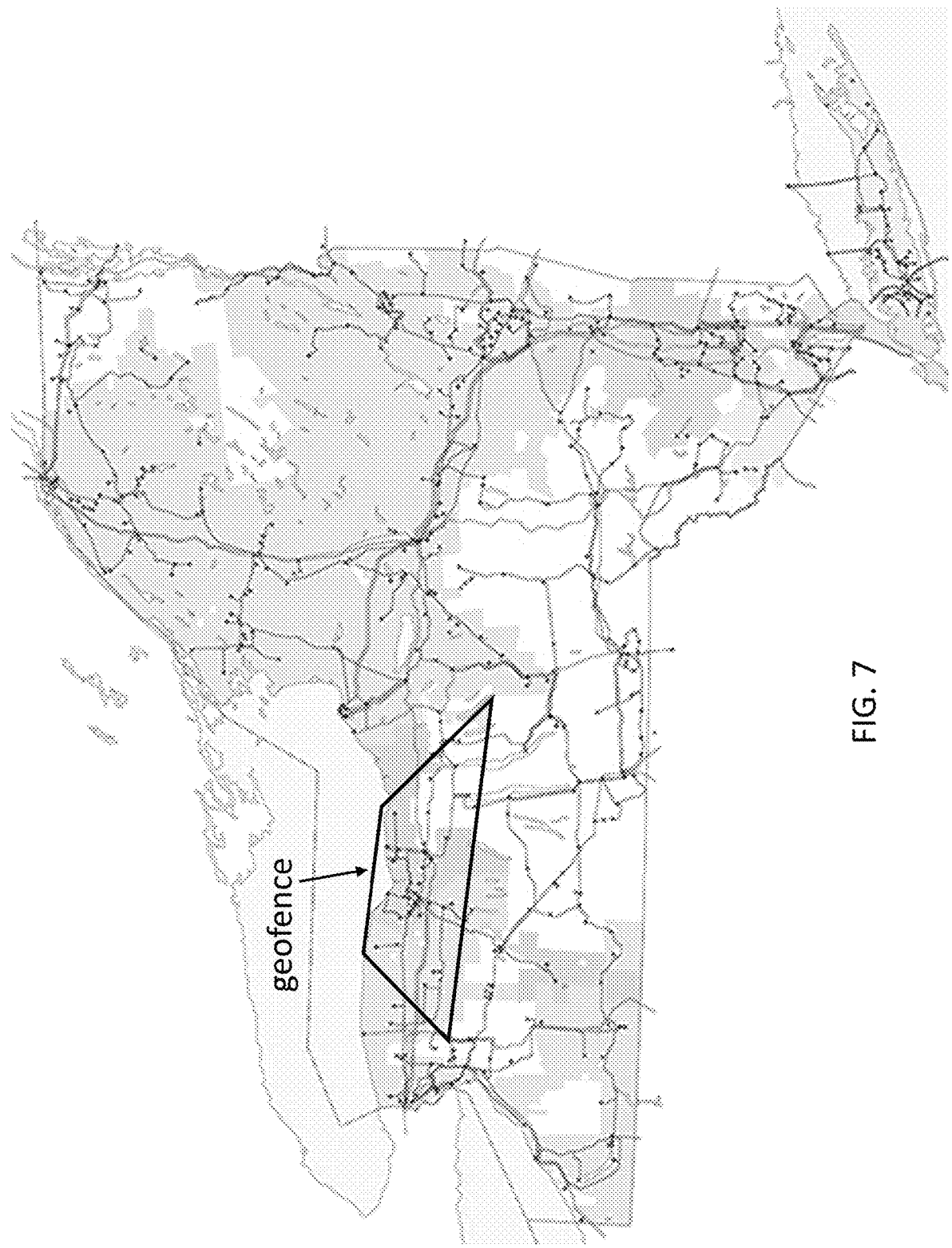
FIG. 7 illustrates a geofence defined in power grid infrastructure for an area.

FIG. 7 illustrates a geofence defined in power grid infrastructure for an area. Once the geofence and specific entitlements are applied within in a global or private registry. A network device configured for the SNM-based network protocol is operable to intentionally build a situational understanding of where that area is and how the network device and its peers relate to that area. The network device is operable to comply with the entitlements in order to manipulate its routing and switching behavior. The network device is further operable to update its routes and policies. The network device is further operable to aggregate IPv6 addresses within the geofence. For example, drones configured for the SNM-based network protocol are operable to detect different parts of the power infrastructure within the geofence; and carry out at least one of the following tasks: inspections, maintenance, storm damage assessment, and security surveillance with more precision and efficiency.

Hospitality Management

The present invention is applicable to property management in hospitality industry. A geofence can be defined in a space-network model for a hotel location and entitlements can be specified for hotel management. In one embodiment, at least one electric LED candle is placed in a hotel room. Each of the at least one electric LED candle is configured for the SNM-based network protocol. Each of the at least one electric LED candle is operable to continuously emit space-network identifiers advertising its address within the geofence in the space-network model. Metadata encoded in a space-network identifier include room number, relative positions within a hotel room, HVAC system within a hotel room, and other electronic switching information.

A network device configured for the SNM-based network protocol is operable to intentionally build a situational understanding of the geofence and related entitlements, and perform certain tasks complying with the entitlements. For example, the network device is operable to receive space-network identifiers, learn the location information and metadata information encoded in the space-network identifiers, for example a room number, temperature information, smoke density, HVAC function information, energy consumption information in a room from which each space-network identifier is emitted. Also as an example, a network device is operable by the hotel management or the HVAC contractors to remotely inspect, control and maintain the HVAC system and other appliance in a specific hotel room.

Vehicular Application: Mobile Space-Network Frames

In a space-network model, a reference frame can be decoupled from a parent frame and subsequently translated, rotated and scaled independently in order to service a mobile space. For example, but not for limitation, the mobile space can be a tectonic plate, a motor vehicle, a flow of vehicles moving on a certain segment of a freeway, etc.

According to the present invention, a reference frame for a moving vehicle is independent and mobile from a global space-network frame. A beacon configured for the SNM-based network protocol is installed in the moving vehicle. In a small area, for example, within a radius of 10 or 30 meters, global uniqueness is not important. In a LAN or PAN network, the odds that an IP number is being reused (i.e., IP collision) is low. This way, the beacon in the moving vehicle can be implemented with a smaller BLE chip, which consumes less power and transmits shorter messages, and the space-network identifiers emitted from the beacon have shorter headers. The space-network identifiers are changeable and unique for different purposes (e.g., marketing campaigns, and traffic reporting). The beacon is operable for broadcast communication and/or directed communication with other vehicles. In one embodiment, the beacon can report impact information based on an accelerometer affixed in the moving vehicle. In one embodiment, the beacon emits software defined PDU over Bluetooth v4.0 Low Energy (BLE).

IPv6 over Low power Wireless Personal Area Networks (6LoWPAN) is a prevailing automotive mesh protocol. In one embodiment, 6LowPAN is used to build regionally unique identifiers in the form of PDUs. 6LoWPAN PDUs have mixed number of bits allowed encoding location information, for example, 16 or 64 bits. The mobile reference frames for different vehicles can be aggregated into large reference frames, and also the network associated with the mobile frames possess aggregation properties, for example, a PAN can be aggregated into a mesh network, which can be aggregated into the global Internet.

In one embodiment, a local reference frame is defined for an area ahead and behind a vehicle within one mile. Sub-micron precision is achieved by creating 64-bit or smaller (with 6LoWPAN header compression) identifiers for each location within the local reference frame. Each identifier for each location is encoded with unique metadata. A prime beacon inside the vehicle acts as an origin for the local reference frame and emits space-network identifiers. In one embodiment, the prime beacon emits 128-bit identifiers.

Figure 8:
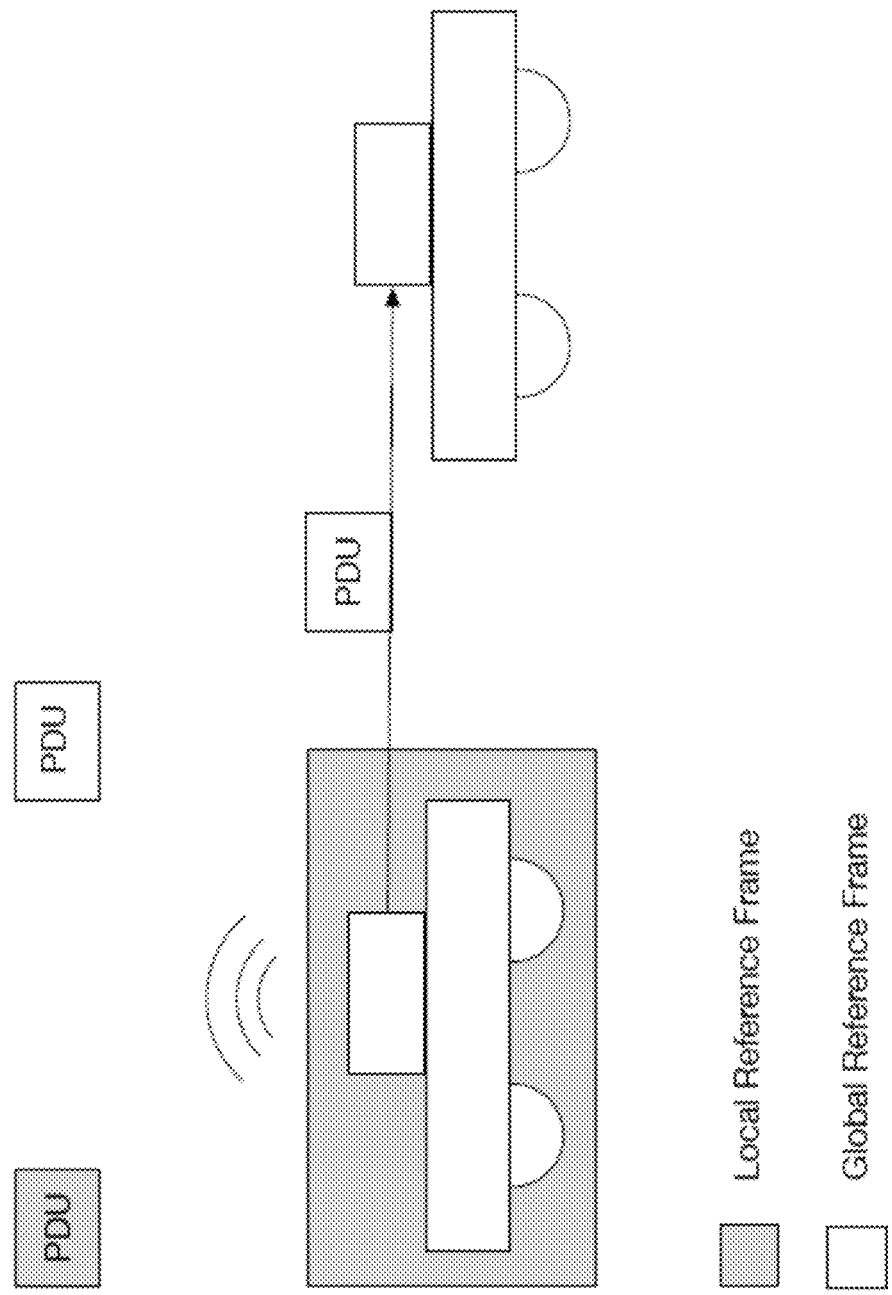
FIG. 8 illustrates a local reference frame built around a vehicle.

FIG. 8 illustrates a local reference frame built around a vehicle. In one embodiment, the prime beacon directs its space-network identifiers in the form of PDUs to surrounding vehicles over 6LoWPAN. In another embodiment, the prime beacon of the local reference frame broadcasts its space-network identifiers in the form of PDUs over 6LoW-PAN. A peer vehicle within the 6LoWPAN listens to the broadcast identifiers, obtains the exact locations of the surrounding vehicles emitting space-network identifiers and other observations from the metadata (e.g., velocity, direction, etc.), decides how close it is to the vehicles emitting identifiers and facilitates decision-making to avoid collision. The local reference frame illustrated in FIG. 8 is preferably designed for autonomous vehicles. In some embodiments, there are radar, sonar, Artificial Intelligence (AI), and/or computer vision technology on board an autonomous vehicle complementary to the local reference frame to detect what an obstacle generally is, for example, debris, drones, animals, etc.

Privacy Protection

Data privacy is becoming an important issue. Data is generated by users at certain time in a certain space. Data privacy is important to user privacy. In one embodiment, the present invention enables users to control their data collected and monetized by server providers. In another embodiment, the present invention provides space owners and regulators the ability to control data transmission in and out of certain space.

In one embodiment, the present invention provides a global privacy policy registry. Users are enabled to register their privacy agreements with website owners, app developers, hardware providers, etc. The global privacy policy registry is updated to date. The global privacy policy registry is updated in real-time or near real-time in one embodiment. In one embodiment, a privacy agreement includes permission to collect certain user generated data, permission to disclose, transfer, or monetize certain user generated data, and conditions thereof (e.g., compensations, time periods, and locations for those permissions). In one embodiment, user generated data includes but is not limited to user profile data, location data, user activity data, etc. In one embodiment, a privacy agreement includes a smart contract for executing and enforcing the terms and conditions of the privacy agreements between users and service providers (e.g., Apps, websites, device providers). By way of example, but not limitation, a user permits a service provider to collect user generated data with compensation. In one embodiment, the compensation is paid via micropayments by cryptocurrency.

In one embodiment, the present invention provides a privacy agent, similar to the fencing agent in the present invention. In one embodiment, the privacy agent is in the form of an application program ("App") installed on a mobile device, for example, a smart phone, a tablet, a laptop, etc. In one embodiment, the privacy agent is embedded in the code of an application on the mobile device, a chip including a processor attached to a memory added to the mobile device, or on a chip in an operating system of the mobile device. For example, but not for limitation, the mobile device is an unmanned aerial vehicle (i.e., drone). The privacy agent is in network communication with the global privacy policy registry. In one embodiment, the mobile device, also has other Apps (e.g., Facebook, Twitter, Instagram) and web browsers installed. The user has a privacy agreement with each of these Apps and websites. Meanwhile, the user device itself has security and privacy settings which enable or disable the device operating system to collect data from the user and/or the user device. All these customized privacy agreements relating to the user and the user device are registered and stored in the global privacy policy registry via a privacy agent.

In one embodiment, the user and a service provider sign a smart contract of privacy agreements via the privacy agent of the present invention. The privacy agent is operable to specify and enforce privacy agreements between the users and the service providers via the smart contract. In one embodiment, the privacy agent installed on a user device is operable to enforce privacy rules against various service providers during a predetermined time period in a predetermined area specified in the privacy agreement.

In one embodiment, the predetermined area is an area with a defined geofence. In one embodiment, users are enabled to define a privacy geofence via a privacy agent on their mobile devices. Privacy rules are specified for the privacy geofence, and the privacy agent is operable to implement the privacy rules when the users and their mobile devices are within the defined privacy geofence.

In one embodiment, owners and regulators of a space are enabled to define a geofence and specify rules for user devices within the geofence. In one embodiment, a regulating device is installed with a privacy agent operable for defining the geofence and the rules within the geofence. In one embodiment, the privacy agent is operable to reach a privacy agreement with user devices within the geofence for complying with the rules of geofence. In one embodiment, the rules comprise permission to move certain data in and out of the geofence of the space through an IP-enabled device inside the geofence of the space. In one embodiment, the privacy agent of the geofence is operable to create an encrypted channel (e.g., virtual private network (VPN)) for data transmission. User devices within the geofence of the space are operable to adhere to the VPN characteristics set for the geofence of the space.

In one exemplary embodiment, a user defines a privacy geofence around his or her house specifying that the user device provider and all the Apps installed on the user device are not allowed to collect location data. In one embodiment, the specific privacy rules defined for the privacy geofence are consistent with the privacy agreements between the user and the service providers on the mobile device. The privacy agent is operable to enforce these rules when the user and the user device is within and/or around the house privacy geofence. In one embodiment, the privacy agent is operable to disable the mobile device and the Apps from collecting location data in and around the house privacy geofence with a certain perimeter. In another embodiment, the privacy agent is operable to generate false location data feed to the various service providers, for example, via VPN. In one embodiment, the Apps and websites stop collecting location data around the house privacy geofence based on the smart contract. In one embodiment, the privacy agent is operable to disable network and cellular connection in and around the privacy geofence, and the Apps and websites are then not able to collect user data based on the agreed privacy rules.

In another exemplary embodiment, a user defines a privacy geofence around a movie theater specifying the user device provider and all the Apps installed on the user device are not allowed to collect location data and other user generated data without signing a smart contract. The smart contract specifies terms and conditions for data collection. If the smart contract is deployed, the user gets paid every time the device provider and/or the Apps collects user location data and other user generated data around the move theater. The transactions are executed in cryptocurrencies via micropayments. Other user generated data may include the user profile data, the starting time of the movie, the duration of the movie, etc.

Certain modifications and improvements will occur to those skilled in the art upon a reading of the foregoing description. In an alternate embodiment of the systems and methods of the present invention, LatLong is used and forward records instead of using IP addresses as described in the foregoing preferred embodiments. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus for providing location-based services, comprising:
a device including a processor, a memory, and a privacy agent, configured for network communication with a database and a global privacy policy registry;
wherein the privacy agent is configured to create at least one geofence corresponding to a specified location and at least one set of privacy rules corresponding to the at least one geofence;
wherein the database is operable to store geofence data associated with the at least one geofence, and a space-network model (SNM) binding Internet Protocol (IP) addresses and physical locations;
wherein the global privacy policy registry is operable to store the at least one set of privacy rules and the at least one geofence;
wherein the privacy agent is operable to enforce the at least one set of privacy rules stored on the global privacy policy registry and enable the location-based services on at least one network device;
wherein enforcement of the at least one set of privacy rules and enablement of the location-based services is based on the geographic locations of the at least one network device within the at least one geofence;
wherein the privacy agent is operable to provide at least one smart contract corresponding to a set of terms and conditions for data collection for the at least one network device;
wherein the privacy agent is operable to identify a geographic location corresponding to the at least one network device using a unique SNM identifier; and
wherein the privacy agent determines whether the at least one network device is within the at least one geofence via comparison of the geofence data stored on the database to the unique SNM identifier-associated geographic location determined for the at least one network device.

2. The apparatus of claim 1, wherein the privacy agent is operable to enforce the at least one set of privacy rules against at least one service provider during a predetermined time period and in a predetermined geographic location, wherein the predetermined time period and the predetermined geographic location are specified in the at least one set of privacy rules.

3. The apparatus of claim 1, wherein the at least one set of privacy rules includes a permission to collect network-device generated data, a permission to disclose network-device generated data, a permission to transfer network-device generated data, and/or a permission to monetize network-device generated data.

4. The apparatus of claim 3, wherein a user receives financial compensation for granting the permission to collect network-device generated data, the permission to disclose network-device generated data, the permission to transfer network-device generated data, and/or the permission to monetize network-device generated data.

5. The apparatus of claim 3, wherein the network-device generated data comprises user profile data, location data, and/or user activity data.

6. The apparatus of claim 1, wherein the privacy agent is operable to generate a false location data feed for the at least one network device and/or at least one mobile application stored on the at least one network device and/or disable the at least one network device and/or the at least one mobile application stored on the at least one network device from collecting location data corresponding to the at least one network device when the at least one network device is located within the at least one geofence via the at least one set of privacy rules.

7. The apparatus of claim 1, wherein the privacy agent is operable to create an encrypted channel for data transmission in and/or out of the at least one geofence.

8. The apparatus of claim 1, wherein the privacy agent is operable to disable network and/or cellular communications when the at least one network device is located within the at least one geofence via the at least one set of privacy rules.

9. The apparatus of claim 1, wherein the SNM is a separate virtual property from the physical location corresponding to the SNM.

10. A method for providing location-based services, comprising:
providing a device including a processor, a memory, and a privacy agent configured for network communication with at least one database and a global privacy policy registry;
the privacy agent creating at least one geofence corresponding to a specified location and at least one set of privacy rules corresponding to the at least one geofence;
the at least one database storing geofence data associated with the at least one geofence, a space-network model (SNM) binding Internet Protocol (IP) addresses and physical locations;
the global privacy policy registry storing the at least one set of privacy rules and the at least one geofence;
the privacy agent enforcing the at least one set of privacy rules and enabling the location-based services on at least one network device;
the privacy agent providing at least one smart contract corresponding to a set of terms and conditions for data collection for the at least one network device;
the privacy agent identifying a geographic location corresponding to the at least one network device using a unique SNM identifier, wherein the unique SNM identifier is updated in real-time or near-real time; and
the privacy agent determining whether the at least one network device is within the at least one geofence by comparing the geofence data stored on the database to the unique SNM identifier-associated geographic location determined for the at least one network device;
wherein enforcement of the at least one set of privacy rules and enablement of the location-based services is based on the geographic location of the at least one network device within the at least one geofence; and
wherein the SNM is a separate virtual property from the physical location corresponding to the SNM.

11. The method of claim 10, wherein the at least one set of privacy rules includes a permission to collect network-device generated data, a permission to disclose network-device generated data, a permission to transfer network-device generated data, and/or a permission to monetize network-device generated data.

12. The method of claim 11, wherein a user receives financial compensation for granting the permission to collect network-device generated data, the permission to disclose network-device generated data, the permission to transfer network-device generated data, and/or the permission to monetize network-device generated data.

13. The method of claim 11, wherein the network-device generated data comprises user profile data, location data, and/or user activity data.

14. A system for providing location-based services, comprising:

a device including a processor, a memory, and a privacy agent configured for network communication with a database and a global privacy policy registry;

wherein the privacy agent is configured to create at least one geofence corresponding to a specified location and at least one set of privacy rules corresponding to the at least one geofence;

wherein the database is operable to store geofence data associated with the at least one geofence, a space-network model (SNM) binding Internet Protocol (IP) addresses and physical locations;

wherein the global privacy policy registry is operable to store the at least one set of privacy rules and the at least one geofence;

wherein the privacy agent is operable to enforce the at least one set of privacy rules and enable the location-based services on at least one network device;

wherein enforcement of the at least one set of privacy rules and enablement of the location-based services is based on the geographic location of the at least one network device within the at least one geofence;

wherein the privacy agent is operable to provide at least one smart contract corresponding to a set of terms and conditions for data collection for the at least one network device;

wherein the privacy agent is operable to identify a geographic location corresponding to the at least one network device using a unique SNM identifier, wherein the unique SNM identifier is updated in real-time or near-real time;

wherein the privacy agent is operable to provide at least one smart contract corresponding to a set of terms and conditions for data collection for the at least one network device;

wherein the SNM is a separate virtual property from the physical location corresponding to the SNM; and wherein the privacy agent determines whether the at least one network device is within the at least one geofence via comparison of the geofence data stored on the database to the unique SNM identifier-associated geographic location determined for the at least one network device.

15. The system of claim 14, wherein the privacy agent is operable to create an encrypted channel for data transmission in and/or out of the at least one geofence.

16. The system of claim 14, wherein the privacy agent is operable to disable the at least one network device and/or at least one mobile application stored on the at least one network device from collecting location data corresponding to the at least one network device when the at least one network device is located within the at least one geofence via the at least one set of privacy rules.

17. The system of claim 14, wherein the privacy agent is operable to generate a false location data feed for the at least one network device via the at least one set of privacy rules.

18. The system of claim 14, wherein the privacy agent is operable to disable network and/or cellular communications when the at least one network device is located within the at least one geofence and/or within a specified distance from the at least one geofence via the at least one set of privacy rules.

* * * * *